(12) United States Patent
Lin et al.

(10) Patent No.: US 9,703,105 B2
(45) Date of Patent: Jul. 11, 2017

(54) STEREO DISPLAY

(75) Inventors: Kuan-Hung Lin, Yilan County (TW);
Wen-Hao Hsu, Hsinchu County (TW);
Lung-Ling Tang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1137 days.

(21) Appl. No.: 13/553,784

(22) Filed: Jul. 19, 2012

(65) Prior Publication Data

US 2013/0286304 A1    Oct. 31, 2013

(30) Foreign Application Priority Data

Apr. 25, 2012  (TW) .............................. 101114789 A (51) Int. Cl.
*G02F 1/1335* (2006.01)
*G02B 27/22* (2006.01)
*H04N 13/04* (2006.01)
*G02F 1/1343* (2006.01)

(52) U.S. Cl.
CPC ... *G02B 27/2214* (2013.01); *G02F 1/133512* (2013.01); *G02F 2001/134345* (2013.01); *H04N 13/04* (2013.01)

(58) Field of Classification Search
None
See application file for complete search history.

(56) References Cited

U.S. PATENT DOCUMENTS

2008/0116459 A1*  5/2008  Chen .................. H01L 27/1288
                                                    257/59
2009/0040401 A1*  2/2009  Tamura et al. ................. 349/15
(Continued)

FOREIGN PATENT DOCUMENTS

CN    101158769    *  4/2008    .......... G02F 1/1333
CN    101363981       2/2009
(Continued)

OTHER PUBLICATIONS

"Office Action of Taiwan Counterpart Application", issued on May 28, 2014, p. 1-p. 6.
(Continued)

*Primary Examiner* — Edward Glick
*Assistant Examiner* — Anthony G Quash
(74) *Attorney, Agent, or Firm* — Jianq Chyun IP Office (57) ABSTRACT

A stereo display including a display panel and a light shieldable element is provided. The display panel has at least two sub-pixel regions. Each sub-pixel region is configured with at least a first pixel electrode to define a first sub-region. The light shieldable element is disposed in front of the sub-pixel regions. Each first pixel electrode has a first shieldable region shielded by the light shieldable element and a first non-shielding region exposed by the light shieldable element. The first shieldable region is closer to the scan line than the first non-shielding region. A horizontal direction is defined as a connection line of two eyes of a user watching the stereo display. A total length A of each sub-pixel region and a length B of the first shieldable region in a predetermined direction intersected to the horizontal direction comply with a relationship that (B/A)×100% is substantially from 1.61% to 47.9%.

29 Claims, 7 Drawing Sheets (56) References Cited

U.S. PATENT DOCUMENTS

| | | | | |
|---|---|---|---|---|
| 2012/0127067 A1* | 5/2012 | Tseng | ................ | G02F 1/134336 |
| | | | | 345/87 |
| 2012/0162157 A1* | 6/2012 | Chuang | ............. | G02F 1/134363 |
| | | | | 345/204 |
| 2012/0235986 A1* | 9/2012 | Ho | ......................... | G02B 27/26 |
| | | | | 345/419 |
| 2012/0327005 A1* | 12/2012 | Hamada | ............. | H04N 13/0413 |
| | | | | 345/173 |
| 2012/0327076 A1* | 12/2012 | Yang | .................. | G02B 27/2214 |
| | | | | 345/419 |

FOREIGN PATENT DOCUMENTS

| | | | | |
|---|---|---|---|---|
| CN | 102156370 | * | 8/2011 | ............. G02F 1/362 |
| JP | WO 2011125373 A1 | * | 10/2011 | ........... G06F 3/0412 |
| TW | 201209448 | | 3/2012 | |

OTHER PUBLICATIONS

"First Office Action of China Counterpart Application", issued on May 30, 2014, p. 1-p. 7.

\* cited by examiner

STEREO DISPLAY

CROSS-REFERENCE TO RELATED APPLICATION

This application claims the priority benefit of Taiwan application serial no. 101114789, filed on Apr. 25, 2012. The entirety of the above-mentioned patent application is hereby incorporated by reference herein and made a part of this specification.

BACKGROUND OF THE DISCLOSURE

Field of the Disclosure

The disclosure relates to a display. Particularly, the disclosure relates to a display applying a stereo display technique.

Description of Related Art

Along with development of technology, enjoyment in material life and a spiritual level requires kept increasing and never reduced. Regarding the spiritual level, in the era of rapid advancement in technology, people want to implement their fantastic imagination through stereo displays to achieve an immersive effect. Therefore, how to present ideal stereo images through the stereo display has become a target to be achieved by a current stereo display technique.

According to visual characteristics of human eyes, when a left eye and a right eye respectively view two images with a same image content and different parallax, the viewer may perceive a stereo image. In a current stereo image display technique, an optical device is generally configured between a display panel and a user, and the optical device is used to control the images received by the left eye and the right eye of the user. When the image information displayed by the display panel simultaneously includes left eye image information and right eye image information, a cross-talk phenomenon that the left eye receives the right eye image information or the right eye receives the left eye image information is probably occurred. In this case, quality of the stereo image viewed by the user is not desirable.

SUMMARY OF THE DISCLOSURE

The invention is directed to a stereo display, which has an ideal display quality.

The invention provides a stereo display including a display panel and a light shieldable element. The display panel has at least two sub-pixel regions. Each of the sub-pixel regions has at least one first pixel electrode to define at least one first sub-region, where the first pixel electrode is connected to at least one data line through at least one first active device, and the first active device is driven by at least one scan line. The light shieldable element is disposed in front of the sub-pixel regions. Each of the first pixel electrodes has a first shieldable region shielded by the light shieldable element and a first non-shielding region exposed by the light shieldable element. The first shieldable region is closer to the scan line compared to the first non-shielding region. A horizontal direction is defined by a connection line of two eyes of a user watching the stereo display, and a total length A of each sub-pixel region and a length B of the first shieldable region along a predetermined direction intersected to the horizontal direction comply with a relationship that a length percentage (B/A)×100% of the length B is substantially from 1.61% to 47.9%.

According to an embodiment of the invention, the light shieldable element is a light-shielding matrix structure, which is configured to shield the scan lines, the data lines, the first shieldable region of each of the first pixel electrode, and an opening defined by the light-shielding matrix structure exposes the first non-shielding region of the first pixel electrode. The display panel has a pair of substrates, and the light-shielding matrix structure is disposed on an inner surface of one of the substrates of the display panel. Alternatively, the display panel has a pair of substrates, and the light-shielding matrix structure is disposed on an outer surface of one of the substrates of the display panel, and the light-shielding matrix structure is covered by a transparent substrate. Now, another transparent substrate is disposed between the outer surface of the one of the substrates of the display panel and the light-shielding matrix structure.

According to an embodiment of the invention, the stereo display further includes a transparent substrate and a non-self luminous electrically-driven layer, where the transparent substrate is disposed in front of the display panel, and the non-self illumination electrically-driven layer is disposed between the display panel and the transparent substrate, and the light shieldable element is a transparent conductive layer, which is configured to drive the non-self illumination electrically-driven layer to be pervious or not pervious to light.

According to an embodiment of the invention, the stereo display further includes a pair of transparent substrates and a non-self illumination electrically-driven layer, where the pair of the transparent substrates are disposed in front of the display panel, and the non-self illumination electrically-driven layer is disposed between the pair of the substrates, the light shieldable element is disposed between the pair of the substrates, and the light shieldable element is a transparent conductive layer, which is configured to drive the non-self illumination electrically-driven layer to be pervious or not pervious to light.

According to an embodiment of the invention, a display medium of the display panel includes a vertical alignment liquid crystal material.

According to an embodiment of the invention, each of the pixel structures further includes at least one second pixel electrode, which is disposed in each of the sub-pixel regions to define a second sub-region outside the first sub-region. The second pixel electrode has a second shieldable region shielded by the light shieldable element and a second non-shielding region exposed by the light shieldable element. The second non-shielding region is closer to the first non-shielding region of the first pixel electrode compared to the second shieldable region. The second pixel electrode of each of the pixel structures in the display panel is connected to at least one second active device, and the first active device and the second active device are respectively connected to different scan lines or the same scan line.

In an embodiment, when a resolution of the display panel is substantially from 92 ppi (pixel per inch) to 65 ppi, the length B of the first shieldable region occupies the length percentage (B/A)×100% of substantially from 1.61% to 9.27% in the predetermined direction, and a length C of the second shieldable region occupies a length percentage (C/A)×100% of substantially from 3.21% to 18.53% in the predetermined direction.

Moreover, when a resolution of the display panel is substantially from 65 ppi to 27.5 ppi, the length B of the first shieldable region occupies the length percentage (B/A)×100% of substantially from 4.43% to 15.97% in the predetermined direction, and a length C of the second shieldable region occupies a length percentage (C/A)×100% of substantially from 8.87% to 31.93% in the predetermined direction.

Alternatively, when a resolution of the display panel is substantially from 47 ppi to 16 ppi, the length B of the first shieldable region occupies the length percentage (B/A)×100% of substantially from 2.16% to 10.45% in the predetermined direction, and a length C of the second shieldable region occupies a length percentage (C/A)×100% of substantially from 4.33% to 20.90% in the predetermined direction.

In another embodiment, when a resolution of the display panel is substantially from 23 ppi to 10 ppi, the length B of the first shieldable region occupies the length percentage (B/A)×100% of substantially from 3.56% to 8.38% in the predetermined direction, and a length C of the second shieldable region of a length percentage (C/A)×100% of substantially from 7.13% to 16.75% in the predetermined direction.

According to the above descriptions, the light shieldable element is configured in the stereo display to shield a part of the pixel electrode. By using the light shieldable element, a stereo display effect of the stereo display is effectively improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
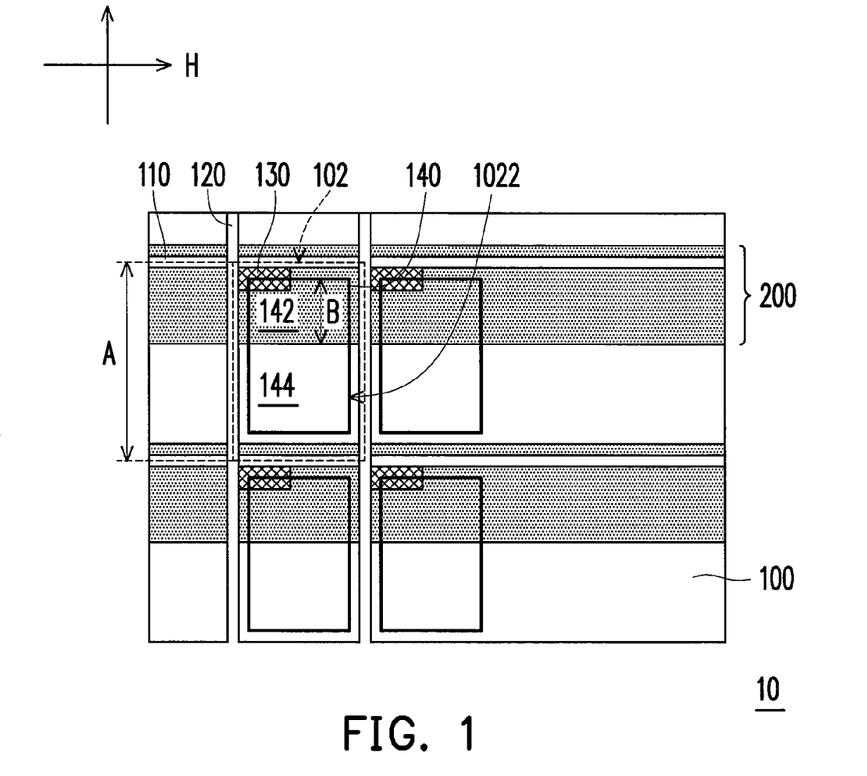
FIG. 1 is a schematic diagram of a stereo display according to an embodiment of the invention.

FIG. 1 is a schematic diagram of a stereo display according to an embodiment of the invention. Referring to FIG. 1, the stereo display 10 includes a display panel 100 and a light shieldable element 200. The display panel 100 is stacked with the light shieldable element 200. The display panel 100, for example, includes a plurality of scan lines 110, a plurality of data lines 120, a plurality of active devices 130, a pixel array composed of a plurality of pixel electrodes 140, and a display medium (not shown) driven by the pixel array. Here, FIG. 1 illustrates relative positions of various components when a user watches the stereo display other than a top view of the stereo display. Namely, in FIG. 1, the stacking sequence of various components is not shown, and only the configuration positions of the components are presented. Moreover, for clearing showing several components, the display medium substantially distributed all over the disposition region of the pixel array is not illustrated in FIG. 1.

Generally, each of the active devices 130 is driven by the corresponding scan line 110 and is connected to the data line 120 and the pixel electrode 140. When the active device 130 is turned on, a signal transmitted by the data line 120 is transmitted to the pixel electrode 140 through the active device 130. In the present embodiment, although it is illustrated that one active device 130 is driven by one corresponding scan line 110 and is connected to one data line 120 and one pixel electrode 140, the invention is not limited thereto. Namely, the amounts of the scan lines 110, the data lines 120, the active devices 130 and the pixel electrodes 140 can be adjusted according to an actual design requirement.

In the present embodiment, the scan lines 110 and the data lines 120 are intersected to define a plurality of sub-pixel regions 102. Each of the sub-pixel regions 102 is, for example, used to display image information of a single color. In other words, boundaries of each of the sub-pixel regions 102 are defined by the scan lines 110 and the data lines 120. Moreover, each of the pixel electrodes 140 is located inside one of the sub-pixel regions 102 to define a sub-region 1022 in the single sub-pixel region 102.

When the user watches the stereo display 10, the display panel 100 can respectively display left eye image information and right eye image information through different sub-pixel regions 102 (for example, the sub-pixel regions of different rows or columns) so that a left eye and a right eye of the user can respectively receive the left eye image information and the right eye image information. Namely, if a connection line of the two eyes of the user is defined as a horizontal direction H, in the stereo display 10, two adjacent sub-pixel regions 102 along an intersected direction V may respectively display different frame information. Preferably, the intersected direction V is substantially a vertical direction perpendicular to the horizontal direction H, though the invention is not limited thereto. In the present embodiment, the light shieldable element 200 is disposed between two adjacent sub-pixel regions 102 along the intersected direction V (for example, the vertical direction), and provides a light-shielding effect, so that the stereo display 10 may have an ideal stereo image display effect.

In detail, each of the pixel electrodes 140 of the present embodiment has a shieldable region 142 shielded by the light shieldable element 200 and a non-shielding region 144 exposed by the light shieldable element 200. Now, a total length A of each sub-pixel region 102 along the intersected direction V (for example, the vertical direction) and a length B of the shieldable region 142 along the intersected direction V (for example, the vertical direction) comply with a relationship that a length percentage (B/A)×100% of the length B relative to the total length A is substantially from 1.61% to 47.9%. In this way, when the shieldable region 142 provides a light-shielding function, a display light having the left eye image information is not received by the right eye of the user or a display light having the right eye image information is not received by the left eye of the user, so as to avoid the cross-talk phenomenon in the stereo display technique.

For example, in order to respectively transmitting the image information displayed by the sub-pixel regions 102 of different rows in the display panel 100 to the left eye and the right eye of the user, an optical device such as a parallax barrier, a phase retarder, a switchable barrier or a switchable lens is generally configured with the stereo display 10 between the user and the display panel 100. The optical device may have left eye regions and right eye regions distributed corresponding to the sub-pixel regions 102 of different rows, so as to facilitate the light having the left eye image information and the right eye image information passing therethrough for being transmitted to the left and right eyes of the user. It is assumed that the image information displayed by one of the sub-pixel regions 102 is predetermined to be transmitted to the left eye of the user, the display light emitted from such sub-pixel region 102 is required to pass through the left eye region of the optical device for being transmitted to the left eye of the user. In case that the light shieldable element 200 is not used, the display light of such sub-pixel region 102 can obliquely emit to pass through the right eye region of the optical device. As such, the image information displayed by the sub-pixel region 102 can be viewed by the right eye of the user, so that the cross-talk phenomenon is occurred. In the present embodiment, the shieldable region 142 of the pixel electrode 140 that is shielded by the light shieldable element 200 occupies a certain proportion of the whole sub-pixel region 102. Therefore, when the light shieldable element 200 provides the light-shielding function, the light shieldable element 200 can shield the obliquely emitted display light to effectively avoid the cross-talk phenomenon.

In the present embodiment, the cross-talk phenomenon can be effectively avoided when the length percentage (B/A)×100% of the length B relative to the total length A is substantially from 1.61% to 47.9%. However, while a display resolution of the display panel 100 is changed, the length percentage of the length B relative to the total length A can also be varied. Namely, the above values can be substantially adjusted according to a design of the stereo display 10. Moreover, the shieldable region 142 is closer to the corresponding scan line 110 the pixel electrode connected to 140 than the non-shielding region 144. Therefore, the area of the light shieldable element 200 can be extended outwards from the position of the scan line 110 along the intersected direction V. Now, besides shielding a part of the pixel electrode 140, the light shieldable element 200 also shields the scan line 110, which avails improving flexibility in a layout design of the stereo display 10. For example, the areas of the devices within the non-shielding region 144 can be easily varied and adjusted without being limited to the existence of the device such as the scan line 110, etc.

It should be noticed that only a part of the components of the stereo display 10 are schematically illustrated in FIG. 1. Actually, the display panel 100 of the stereo display 10 may further include a display medium, a driving circuit and at least one substrate used for packaging the display medium and carrying the pixel array, etc. Moreover, the light shieldable element 200 can also be implemented by various approaches. Therefore, partial cross-sectional designs of the stereo display 10 are described blow, though the following embodiments are only exemplary embodiments, and the invention is not limited thereto.

Figure 2:
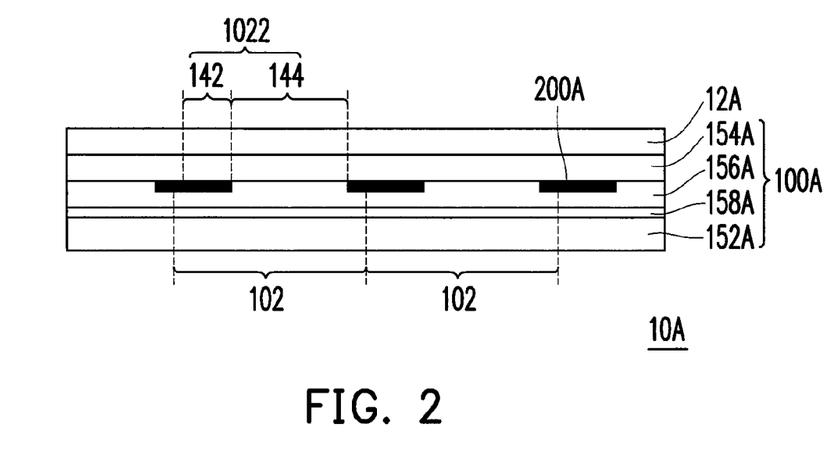
FIG. 2 illustrates a cross-sectional design of a stereo display according to a first embodiment of the invention.

FIG. 2 illustrates a cross-sectional design of a stereo display according to a first embodiment of the invention. Referring to FIG. 2, the stereo display 10A includes a display panel 100A, a light shieldable element 200A and an optical device 12A. The optical device 12A is disposed in front of the display panel 100A, which is, for example, a parallax barrier, a switchable parallax barrier, a phase retarder, or a switchable phase retarder, etc., so that the display light of the display panel 100A can be correspondingly received by the left eye or the right eye of the user. In an example, the left and right eye image pixels distributed alternatively in the display panel 100A may simultaneously display, and the optical device 12A (for example, a parallax barrier film) disposed in front of the display panel 100A limits a propagating path of the light. In this way, the viewer may have a stereo visual experience while locates at a setting area the light of the left image pixels and the light of the right image pixels focusing at, and perceives the cross-talk phenomenon while locates at a non-setting area outside of the setting area.

In the present embodiment, the display panel 100A includes a pair of substrates 152A and 154A, a display medium 156A and a pixel array layer 158A. The pixel array layer 158A is disposed on the substrate 152A, and substantially includes the scan lines 110, the data lines 120, the active devices 130 and the pixel electrodes 140 shown in FIG. 1. The display medium 156A is packaged between the substrate 152A and the substrate 154A. In an embodiment, a material of the display medium 156A can be a self-luminous material (for example, an organic luminous material, an inorganic luminous material, or other suitable materials, or a combination thereof), a non-self luminous material (for example, a liquid crystal material, an electrophoretic material, an electro-wetting material, or other suitable materials), or other materials capable of causing different brightness of display lights, or a combination of any two of the aforementioned materials. Here, although the pixel array layer 158A is disposed on an inner surface of the substrate 152A, the invention is not limited thereto, and in other embodiments, the pixel array layer 158A can also be disposed on an inner surface of the substrate 154A.

Moreover, the light shieldable element 200A is disposed on the inner surface of the substrate 154A. Now, the light shieldable element 200A is an opaque structure built in the display panel 100A, which is used as a light-shielding element of a general display panel and a light shieldable element of the stereo display. Namely, the light shieldable element 200A of the present embodiment is a fixed light-shielding element, which can be fabricated by known light-shielding materials, e.g. black resin or the like. In the present embodiment, although the light shieldable element 200A and the pixel array layer 158A are respectively disposed on the different substrates 152A and 154A, in other embodiments, the light shieldable element 200A can be selectively integrated in the pixel array layer 158A. Namely, the light shieldable element 200A can be disposed on the inner surface of the substrate 152A. It should be noticed that the aforementioned light-shielding element of the general display panel is not suitable to serve as the light shieldable element of the stereo display. Since the light-shielding element of the general display panel only shields the areas of the data lines, the scan lines and the active devices, a total ratio of the pixel electrode shielded by the light-shielding element along the intersected (vertical) direction V is smaller than 1%, which is not suitable to serve as the light shieldable element of the stereo display.

Moreover, according to FIG. 1 and FIG. 2, it is known that the pixel array layer 158A defines a plurality of the sub-pixel regions 102, and the pixel electrode 140 located in one of the sub-pixel regions 102 defines the corresponding sub-region 1022. The light shieldable element 200A shields a specific area of each of the pixel electrodes 140 to define the shieldable region 142 and the non-shielding region 144, though the light shieldable element 200A may further substantially shield the scan lines 110, the data lines 120 and the active devices 130. In this way, the aforementioned light-shielding element of the general display panel is unnecessary to be additionally configured in the display panel 100A to shield the components undesired to be viewed by the user.

Figure 3:
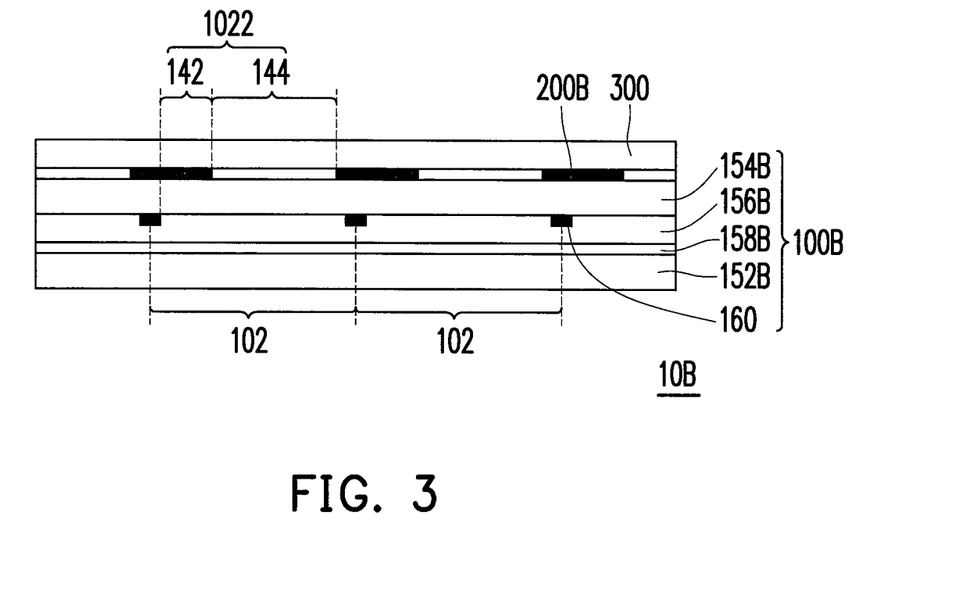
FIG. 3 illustrates a cross-sectional design of a stereo display according to a second embodiment of the invention.

FIG. 3 illustrates a cross-sectional design of a stereo display according to a second embodiment of the invention. Referring to FIG. 3, the stereo display 10B includes a display panel 100B, a light shieldable element 200B and a transparent substrate 300. The transparent substrate 300 is disposed in front of the display panel 100B. Moreover, the light shieldable element 200B is disposed between an outer surface of the substrate 154B and the transparent substrate 300. The transparent substrate 300 and the light shieldable element 200B may construct an optical device 12A as that shown in FIG. 2, which is, for example, a parallax barrier, so that the display light of the display panel 100B can be correspondingly received by the left eye or the right eye of the user under a shielding function of the light shieldable element 200B. Namely, the light having the left and right eye image pixels distributed alternatively in the display panel 100B may simultaneously display, and the optical device (for example, a parallax barrier film) that is formed by the transparent substrate 300 and the light shieldable element 200B and disposed in front of the display panel 100A limits a propagating path of the light. In this way, the viewer may have a stereo visual experience at a setting area the light of the left image pixels and the light of the right image pixels focusing at. However, the viewer may perceive the cross-talk phenomenon at a non-setting area outside the setting area.

The display panel 100B includes a pair of substrates 152B and 154B, a display medium 156B, a pixel array layer 158B and a light-shielding matrix structure 160. The pixel array layer 158B is disposed on the substrate 152B, and substantially includes the scan lines 110, the data lines 120, the active devices 130 and the pixel electrodes 140 shown in FIG. 1. The display medium 156B is packaged between the substrate 152B and the substrate 154B. The light-shielding matrix structure 160 is, for example, disposed on the inner surface of the substrate 154B. Similar to the aforementioned embodiment, a material of the display medium 156B can be a self-luminous material (for example, an organic luminous material, an inorganic luminous material, or other suitable materials, or a combination thereof), a non-self luminous material (for example, a liquid crystal material, an electrophoretic material, an electro-wetting material, or other suitable materials), or other materials capable of causing different brightness of display lights, or a combination of at least two of the aforementioned materials. Here, although the light-shielding matrix structure 160 is disposed on the inner surface of the substrate 154B, in other embodiments, the light-shielding matrix structure 160 can also be integrated to the pixel array layer 158B, and implementation of the light-shielding matrix structure 160 is not limited by the invention.

In the present embodiment, the light-shielding matrix structure 160 in the display panel 100B is different to the light shieldable element 200B, where a shielding area of the light-shielding matrix structure 160 is, for example, substantially smaller than a shielding area of the light shieldable element 200B. In case that the pixel array layer 158B has the components shown in FIG. 1, the light-shielding matrix structure 160, for example, shields the areas of the scan lines 110, the data lines 120 and the active devices 130 and exposes the area of the pixel electrode 140. Now, the shieldable region 142 of the pixel electrode 140 is covered by the light shieldable element 200B, and is not covered by the light-shielding matrix structure 160.

In the present embodiment, the light shieldable element 200B can be fabricated on the transparent substrate 300, and the transparent substrate 300 can be adhered to the display panel 100B through an adhesion. The light shieldable element 200B is disposed on the outer surface of the display panel 100B through an adhesion, so that the configuration of the light shieldable element 200B does not influence a design of the display panel 100B. Alternatively, in other embodiments, the light shieldable element 200B can be fabricated on an outer surface of the transparent substrate 154B, and the transparent substrate 300 is adhered to the display panel 100B through an adhesion. The applications of the display panel 100B may have at least two methods, wherein one is to be combined with the light shieldable element 200B, and another one is not to be combined with the light shieldable element 200B. In the method that the display panel 100B is combined with the light shieldable element 200B, the cross-talk phenomenon of the stereo images can be mitigated. Moreover, in the method that the light shieldable element 200B is not disposed in front of the display panel 100B, the display panel 100B may have an ideal display aperture ratio, though it does not have the stereo display effect. The user and the designer may select one of the application methods according to different application requirements.

Figure 4:
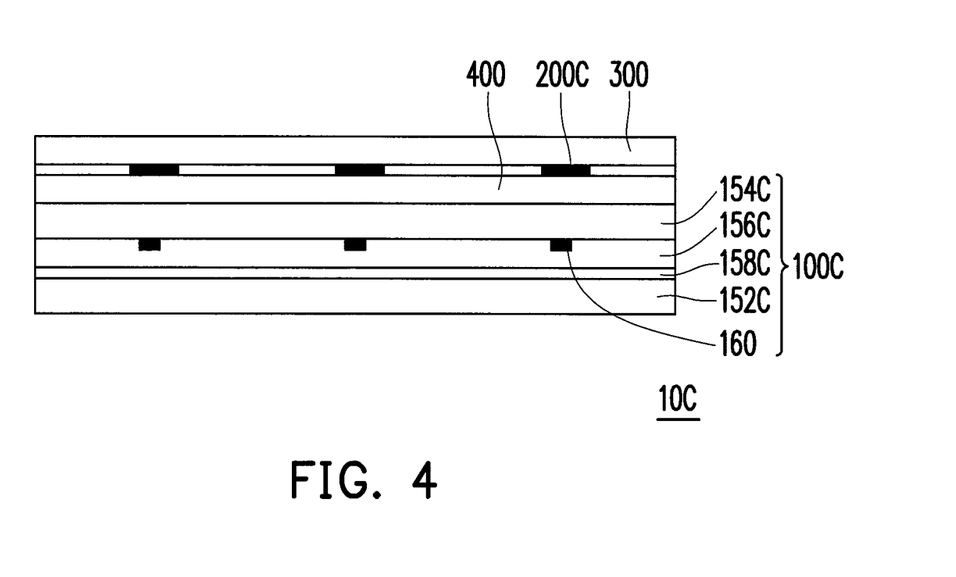
FIG. 4 illustrates a cross-sectional design of a stereo display according to a third embodiment of the invention.

FIG. 4 illustrates a cross-sectional design of a stereo display according to a third embodiment of the invention. Referring to FIG. 4, the stereo display 10C includes a display panel 100C, a light shieldable element 200C and a pair of transparent substrates 300 and 400. The transparent substrates 300 and 400 are disposed in front of the display panel 100C. Moreover, the light shieldable element 200C is disposed between the transparent substrates 300 and 400. Now, the pair of the substrates 300 and 400 and the light shieldable element 200C sandwiched between the two substrates 300 and 400 form the optical device 12A as that shown in FIG. 2, which is, for example, a parallax barrier, so that the display light of the display panel 100C can be correspondingly received by the left eye or the right eye of the user under a shielding function provided by the light shieldable element 200C. Namely, the light having the left and right eye image pixels distributed alternatively in the display panel 100C may simultaneously display, and the optical device (for example, a parallax barrier) disposed in front of the display panel 100C that is formed by the transparent substrates 300 and 400 and the light shieldable element 200C sandwiched therebetween limits a propagating path of the light. In this way, the viewer may have a stereo visual experience at a setting area with the light of the left image pixels and the light of right image pixels focusing at. However, the viewer may perceive the cross-talk phenomenon at a non-setting area outside the setting area.

In the present embodiment, the display panel 100C includes a pair of substrates 152C and 154C, a display medium 156C, a pixel array layer 158C and the light-shielding matrix structure 160. The pixel array layer 158C is disposed on the substrate 152C, and substantially includes the scan lines 110, the data lines 120, the active devices 130 and the pixel electrodes 140 shown in FIG. 1. The display medium 156C is packaged between the substrate 152C and the substrate 154C. The light-shielding matrix structure 160 is, for example, disposed on the inner surface of the substrate 154C. Here, the pixel array layer 158C is only schematically illustrated, and FIG. 1 and the related descriptions of FIG. 1 can be referred for the descriptions of various components of the pixel array layer 158C. Moreover, similar to the aforementioned embodiment, a material of the display medium 156C can be a self-luminous material (for example, an organic luminous material, an inorganic luminous material, or other suitable materials, or a combination thereof), a non-self luminous material (for example, a liquid crystal material, an electrophoretic material, an electro-wetting material, or other suitable materials), or other materials capable of causing different brightness of display lights, or a combination of at least two of the aforementioned materials.

The light-shielding matrix structure 160 in the display panel 100C is different to the light shieldable element 200C, where the shielding area of the light-shielding matrix structure 160 is, for example, substantially smaller than a shielding area of the light shieldable element 200C. Namely, shielding effects provided by the light shieldable element 200C and the light-shielding matrix structure 160 are different. Moreover, the light shieldable element 200C is adhered to the outer surface of the display panel 100C, and the light shieldable element 200C is formed between the pair of the transparent substrates 300 and 400. The display panel 100C may have at least two application methods as that of the aforementioned display panel 100B, wherein one is to be combined with the light shieldable element 200C, and another one is not to be combined with the light shieldable element 200C.

Figure 5:
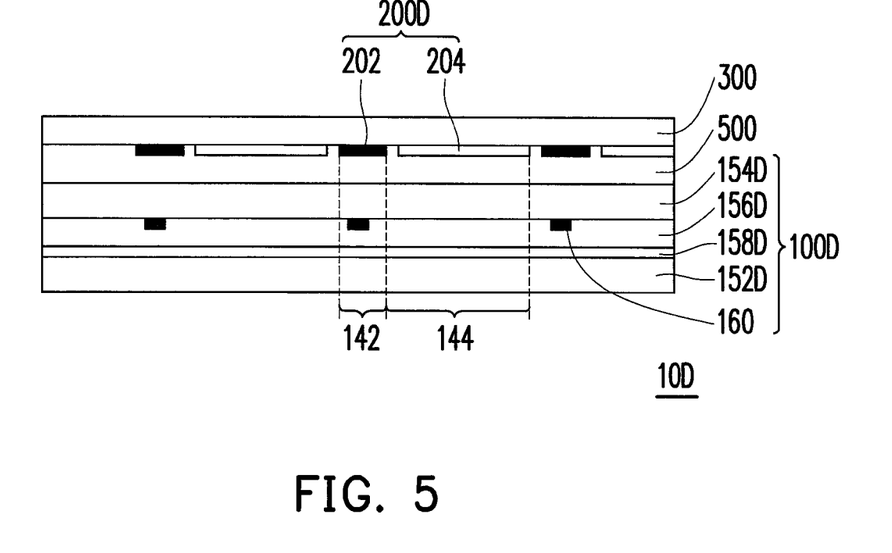
FIG. 5 illustrates a cross-sectional design of a stereo display according to a fourth embodiment of the invention.

FIG. 5 illustrates a cross-sectional design of a stereo display according to a fourth embodiment of the invention. Referring to FIG. 5, the stereo display 10D includes a display panel 100D, a light shieldable element 200D, the transparent substrate 300 and a non-self luminous electrically-driven layer 500. The transparent substrate 300 is disposed in front of the display panel 100D, and the non-self luminous electrically-driven layer 500 is disposed between the display panel 100D and the transparent substrate 300. A non-self luminous electrically-driven material of the non-self luminous electrically-driven layer 500 includes a liquid crystal material, an electrophoretic material, an electro-wetting material, or other suitable materials. Similar to the aforementioned embodiments, the display panel 100D also includes a pair of substrates 152D and 154D, a display medium 156D, a pixel array layer 158D and the light-shielding matrix structure 160. The pixel array layer 158D may include the scan lines 110, the data lines 120, the active devices 130 and the pixel electrodes 140 shown in FIG. 1. The light-shielding matrix structure 160 is an opaque structure disposed in the display panel 100D to shield the scan lines 110, the data liens 120 and the active devices 130. In the present embodiment, the light-shielding matrix structure 160 is, for example, disposed on the inner surface of the substrate 154D. In other embodiments, the light-shielding matrix structure 160 can be selectively disposed on the inner surface of the substrate 152D.

In the present embodiment, the light shieldable element 200D is, for example, a transparent conductive layer disposed between the transparent substrate 300 and the display panel 100D, which is used to drive the non-self luminous electrically-driven layer 500 to be pervious or impervious to the light, or drive the non-self luminous electrically-driven layer 500 to refract the light emitted from the display panel 100D to the left eye or right eye of the viewer. In the present embodiment, the light shieldable element 200D is, for example, disposed on the inner surface of the substrate 300. In other embodiments, the light shieldable element 200D is selectively disposed on the outer surface of the substrate 154D. Driven by the light shieldable element 200D, the non-self luminous electrically-driven layer 500 may provide different optical characteristics corresponding to a plurality of display modes of the stereo display 10D, for example, a stereo display mode and a planar display mode (or namely two dimensional display mode). In the condition that the material of the non-self luminous electrically-driven layer 500 is the liquid crystal material, for example, the non-self luminous electrically-driven layer 500 driven by the light shieldable element 200D can provide the function of a switchable phase retarder, a switchable parallax barrier, or a switchable lens.

In detail, the light shieldable element 200D, for example, includes an electrode 202 and an electrode 204. An area of the electrode 202, for example, corresponds to the shieldable region 142 of FIG. 1, and an area of the electrode 204, for example, corresponds to the non-shielding region 144 of FIG. 1. In the present embodiment, one electrode 202 and one electrode 204 are disposed on the inner surface of the substrate 300 or on the outer surface of the substrate 154D for providing a horizontal electric field to drive the non-self luminous electrically-driven layer 500. In other exemplary embodiments, there are two electrodes 202 and two electrodes 204, where one of the electrodes 202 and one of the electrodes 204 are disposed on the inner surface of the substrate 300, and the other electrode 202 and the other electrode 204 are disposed on the outer surface of the substrate 154D for providing a vertical electric field to drive the non-self luminous electrically-driven layer 500. When the stereo display 10D displays the stereo images, the voltage applied to the electrode 204 can drive the non-self luminous electrically-driven layer 500 to allow the display light of the corresponding region transmitting to the left eye or the right eye of the user. Namely, the electrode 204 can be regarded as a component in the switchable phase retarder that defines a left eye region and a right eye region. Meanwhile, the voltage applied to the electrode 202 can drive the non-self luminous electrically-driven layer 500 to continually present an opaque state in the stereo display mode, so as to provide the required light-shielding effect.

The non-self luminous electrically-driven layer 500 may have at least a transparent state and the opaque state when it is driven by the light shieldable element 200D. Therefore, the light shieldable element 200D can selectively make the non-self luminous electrically-driven layer 500 to provide the light-shielding effect or otherwise. When the non-self luminous electrically-driven layer 500 does not provide the light-shielding effect, the stereo display 10D has a substantially greater display aperture ratio. When the non-self luminous electrically-driven layer 500 provides the light-shielding effect, the stereo display 10D has a substantially smaller display aperture ratio, and such design may effectively mitigate the cross-talk phenomenon of the stereo images. The stereo display 10D can display images through one of the aforementioned manners according to an actual requirement.

Figure 6:
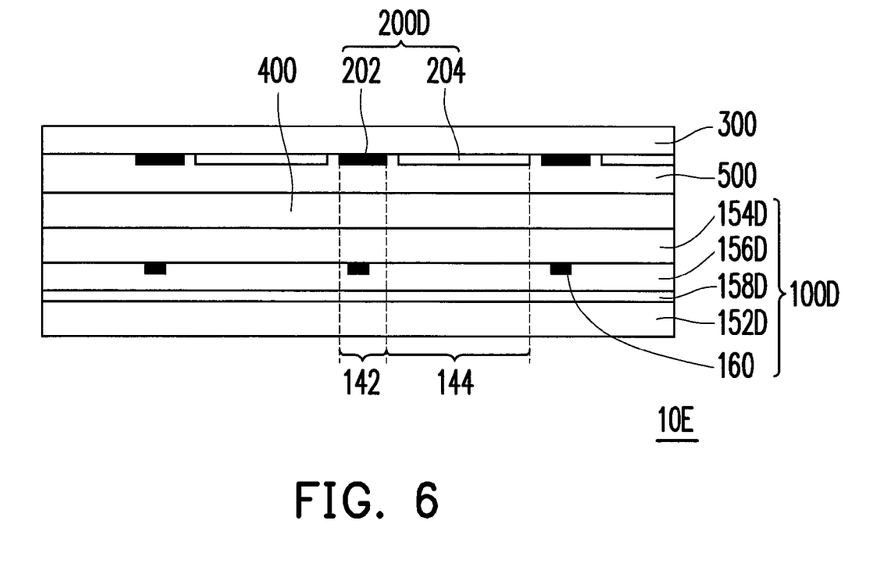
FIG. 6 illustrates a cross-sectional design of a stereo display according to a fifth embodiment of the invention.

Moreover, FIG. 6 illustrates a cross-sectional design of a stereo display according to a fifth embodiment of the invention. Referring to FIG. 6, the stereo display 10E is substantially similar to the stereo display 10D of FIG. 5, and a difference therebetween is that the stereo display 10E uses a pair of transparent substrates 300 and 400 to package the non-self luminous electrically-driven layer 500. Namely, the pair of the transparent substrates 300 and 400 is disposed in front of the display panel 100D, and the non-self luminous electrically-driven layer 500 is packaged between the transparent substrates 300 and 400. Now, the transparent substrate 300, the transparent substrate 400, the non-self luminous electrically-driven layer 500 and the light shieldable element 200D can be regarded as an independent switchable phase retarder, a switchable parallax barrier or a switchable lens, and the stereo display 10E is, for example, composed of the attaching of the display panel 100D and the independent switchable phase retarder. It should be noticed that in the independent switchable phase retarder, the electrode 202 included in the light shieldable element 200D drives the non-self luminous electrically-driven layer 500 to continually present the opaque state in the stereo display mode, and the electrode 204 drives the non-self luminous electrically-driven layer 500 to switch between different states to define the left eye region and the right eye region, or drives the non-self luminous electrically-driven layer 500 of different regions under the stereo display mode to continually present a light refraction state, so that the refracted light only enters the left eye region or the right eye region. Moreover, a design of the electrode 202 and the electrode 204 can be similar to that described with reference of FIG. 5.

Figure 7:
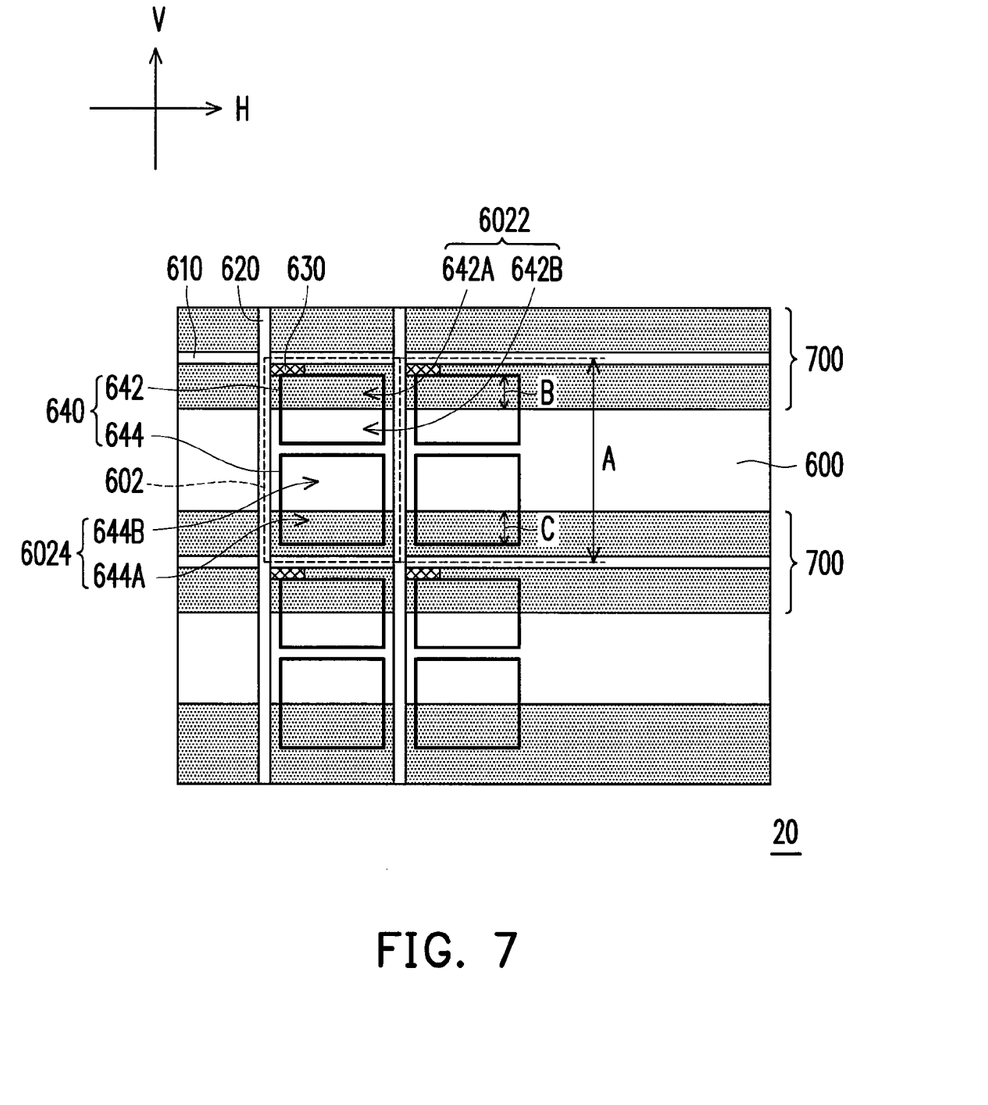
FIG. 7 is a schematic diagram of a stereo display according to another embodiment of the invention.

In the aforementioned embodiment, as shown in FIG. 1, one pixel electrode 140 is disposed in each of the sub-pixel regions 102, though the design of the display panel 100 is not limited thereto. For example, FIG. 7 is a schematic diagram of a stereo display according to another embodiment of the invention. Referring to FIG. 7, the stereo display 20 includes a display panel 600 and a light shieldable element 700, where the light shieldable element 700 can be implemented according to the implementations shown in FIGS. 2-6, so that the display light of the display panel 600 can be selectively received by the left eye or the right eye of the user, which is not repeated.

According to FIG. 7, it is known that the display panel 600, for example, includes a plurality of scan lines 610, a plurality of data lines 620, a plurality of active devices 630 and a pixel array having a plurality of pixel electrodes 640. Moreover, as that described in the aforementioned embodiments, the display panel 600 further includes a display medium (not shown) driven by the pixel array. Generally, each of the active devices 630 is driven by the corresponding scan line 610 and is connected to the data line 620 and the pixel electrode 640. When the active device 630 is turned on, a signal transmitted through the data line 620 can be transmitted to the pixel electrode 640 through the active device 630.

In the present embodiment, the scan lines 610 and the data lines 620 are intersected to define a plurality of sub-pixel regions 602, and a plurality of pixel electrodes 640 are configured in each of the sub-pixel regions 602. In the present embodiment, at least one first pixel electrode 642 and one second pixel electrode 644 are, for example, configured in each of the sub-pixel regions 602. In detail, the first pixel electrode 642 and the second pixel electrode 644 respectively define a first sub-region 6022 and a second sub-region 6024 in the same sub-pixel region 602, where the second sub-region 6024 is located outside the first sub-region 6022. Namely, the first pixel electrode 642 and the second pixel electrode 644 are not overlapped with each other in the top view, so that two non-overlapped sub-regions 6022 and 6024 are defined.

In an embodiment, when the display medium of the display panel 600 is a vertical alignment liquid crystal material, the first sub-region 6022 and the second sub-region 6024 may present different display voltages to mitigate a color washout phenomenon, so as to provide an ideal display effect. However, the invention is not limited to use the vertical alignment liquid crystal material as the display medium of the display panel 600. In other types of display panels, the design of configuring at least two pixel electrodes in the same sub-pixel region can also be adopted.

When the user watches the stereo display 20, if a connection line of the two eyes of the user is defined as the horizontal direction H, the adjacent sub-pixel regions 602 of different rows along a predetermined (vertical) direction V in the stereo display 29 may respectively display different image information for the left eye and the right eye of the user. In order to avoid the cross-talk phenomenon of the stereo images, the light shieldable element 700 is disposed between the adjacent sub-pixel regions 602 of different rows along the predetermined (vertical) direction V. In this way, each of the first pixel electrode 642 has a first shieldable region 642A shielded by the light shieldable element 700 and a first non-shielding region 642B exposed by the light shieldable element 700. Similarly, each of the second pixel electrode 644 has a second shieldable region 644A shielded by the light shieldable element 700 and a second non-shielding region 644B exposed by the light shieldable element 700. By partially shielding the first pixel electrode 642 and the second pixel electrode 644 through the light shieldable element 700, the cross-talk phenomenon of the stereo images can be mitigated.

Along with different resolution designs of the display panel 600, an area ratio shielded by the light shieldable element 700 can be adjusted. For example, a total length A of each of the sub-pixel regions 602 along the intersected direction V (for example, the vertical direction), a length B of the first shieldable region 642A along the intersected direction V (for example, the vertical direction), and a length C of the second shieldable region 644A along the intersected direction V (for example, the vertical direction) can comply with following relationships. In an embodiment, when the resolution of the display panel 600 is from about 92 ppi (pixel per inch) to about 65 ppi, a length percentage (B/A)×100% of the length B is substantially from 1.61% to 9.27%, and a length percentage (C/A)×100% of the length C is substantially from 3.21% to 18.53%. When the resolution of the display panel 600 is from about 65 ppi to about 27.5 ppi, the length percentage (B/A)×100% of the length B is substantially from 4.43% to 15.97%, and the length percentage (C/A)×100% of the length C is substantially from 8.87% to 31.93%. Alternatively, when the resolution of the display panel 600 is from about 47 ppi to about 16 ppi, the length percentage (B/A)×100% of the length B is substantially from 2.16% to 10.45%, and the length percentage (C/A)×100% of the length C is substantially from 4.43% to 20.90%. In another embodiment, when the resolution of the display panel 600 is from about 23 ppi to about 10 ppi, the length percentage (B/A)×100% of the length B is substantially from 3.56% to 8.38%, and the length percentage (C/A)×100% of the length C is substantially from 7.13% to 16.75%.

Moreover, in the present embodiment, the second non-shielding region 644B is closer to the first non-shielding region 642B of the first pixel electrode 642 than the second shieldable region 644A. Meanwhile, as the scan lines 610 are shielded by the light shieldable element 700, an area in the single sub-pixel region 602 that is exposed by the light shieldable element 700 does not have an opaque element extending along the horizontal direction H, so that an area ratio of the exposed portions of the first pixel electrode 642 and the second pixel electrode 644 is not limited.

For example, in order to mitigate a coupling phenomenon between the scan line 610 and the pixel electrode 640, the scan line 610 is generally set as a boundary between the first pixel electrode 642 and the second pixel electrode 644, such that the scan line 610 is located in the area of the single sub-pixel region 602 that is exposed by the light shieldable element 700. Now, a layout of the first pixel electrode 642 and the second pixel electrode 644 is limited. However, in the present embodiment, the boundary between the first pixel electrode 642 and the second pixel electrode 644 can be adjusted according to an actual requirement, and is not limited by the scan line 610 or other opaque elements extending along the horizontal direction H, which avails improving layout flexibility of the pixel electrode 640.

Figure 8:
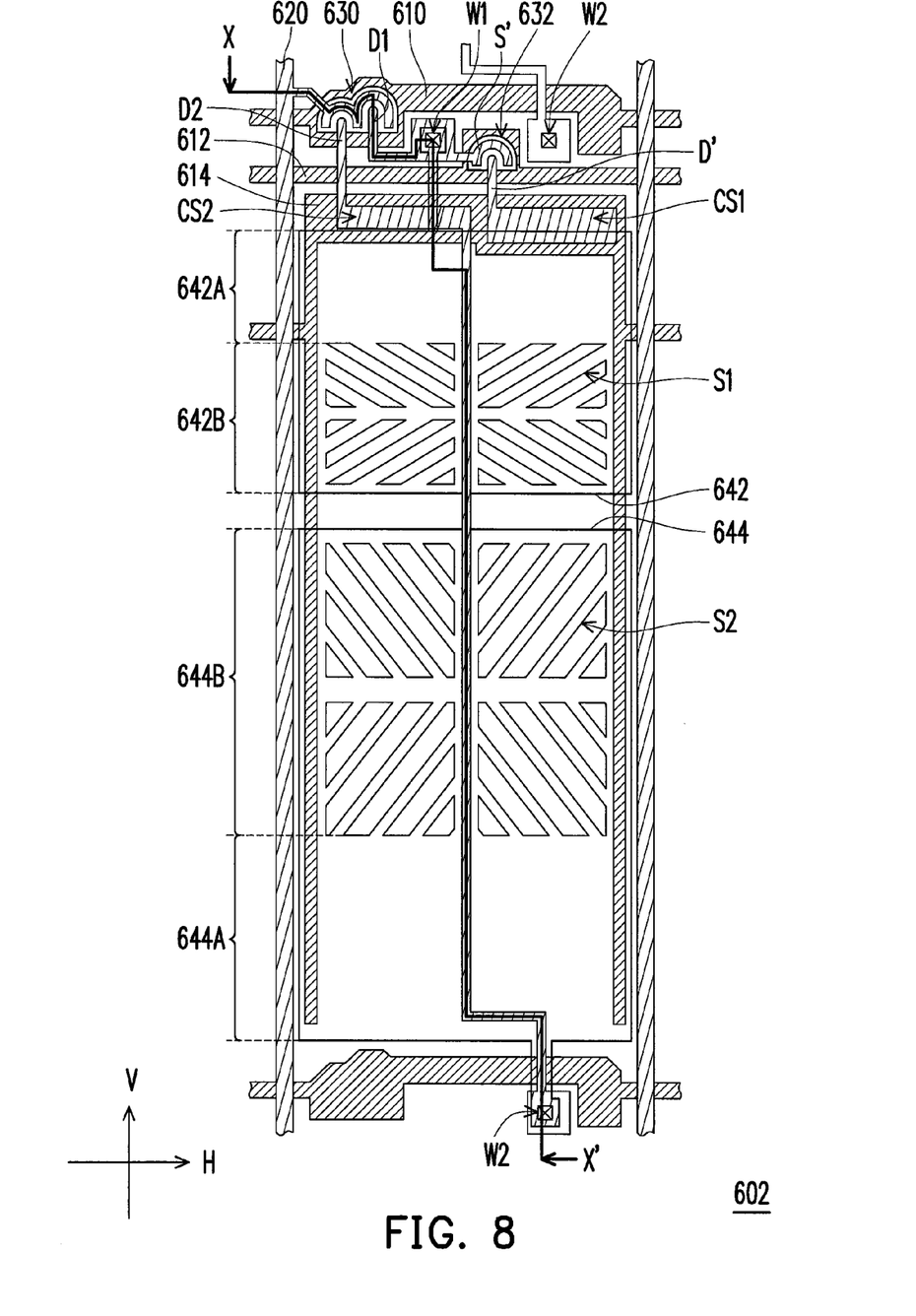
FIG. 8 is a schematic diagram of a layout design of various components in a single sub-pixel region of a display panel of FIG. 7.
Figure 9:
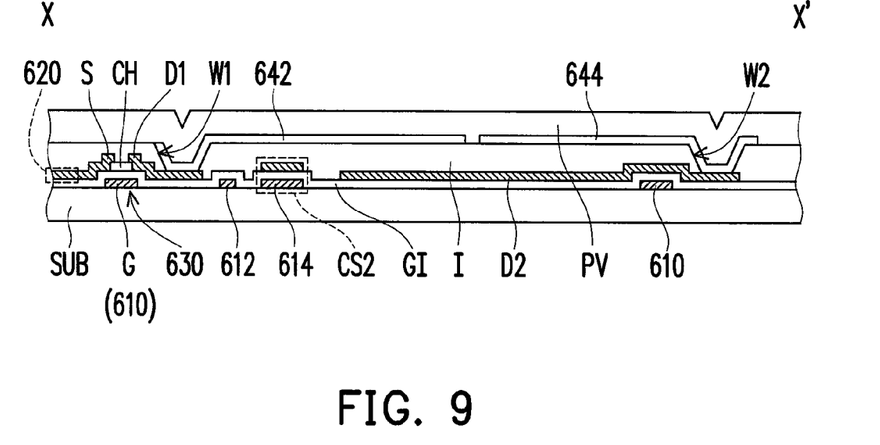
FIG. 9 is a cross-sectional view of the display panel depicted in FIG. 8 along a sectional line X-X'.

Moreover, FIG. 8 is a schematic diagram of a layout design of various components in a single sub-pixel region of the display panel of FIG. 7, and FIG. 9 is a cross-sectional view of FIG. 8 along a sectional line X-X'. Referring to FIG. 8 and FIG. 9, the components configured in the sub-pixel region 602 includes, for example, the scan line 610, the data line 620, the active device 630, the first pixel electrode 642, the second pixel electrode 644, an auxiliary scan line 612, a common electrode line 614, a storage capacitor CS1 and a storage capacitor CS2, where coupling relations of the scan line 610, the active device 630, the first pixel electrode 642 and the second pixel electrode 644 are similar to that described in the aforementioned embodiments.

The auxiliary scan line 612 and the common electrode line 614 are selectively disposed between the first pixel electrode 642 and the scan line 610. Preferably, the auxiliary scan line 612 is disposed between the scan line 610 and the common electrode line 614, though the invention is not limited thereto. The auxiliary scan line 612 is configured to drive an auxiliary active device 632 which connects to the first pixel electrode 642 and the storage capacitor CS1. The common electrode line 614 serves as one end of the storage capacitor CS1 and the storage capacitor CS2, and a drain D' of the auxiliary active device 632 serves as another end of the storage capacitor CS1, and the storage capacitor CS2 is connected between the second pixel electrode 644 and the active device 630. Moreover, in the present embodiment, the active device 630 can be a thin-film transistor (TFT) with a dual-drain design, where the two drains thereof are respectively connected to the first pixel electrode 642 and the second pixel electrode 644. Herein, a second drain D2 of the dual-drain TFT crosses over the first pixel electrode 642 and the second pixel electrode 644. The second drain D2 is connected to the second pixel electrode 644 at a position (referring to FIG. 9) adjacent to the second pixel electrode 644, and a first drain D1 of the dual-drain TFT is connected to a source S' of the auxiliary active device 632 and the first pixel electrode 642. The second drain D2 of the dual-drain TFT also serves as another end of the storage capacitor CS2. Moreover, another auxiliary storage capacitor Cst (not shown) can be selectively configured in the present embodiment. For example, the common electrode line 614 serves as one end of the auxiliary storage capacitor Cst (not shown), and the first pixel electrode 642 serves as another end of the auxiliary storage capacitor. Alternately, the common electrode line 614 serves as one end of the auxiliary storage capacitor Cst, and the second pixel electrode 644 serves as another end of the auxiliary storage capacitor, etc.

In detail, referring to FIG. 8 and FIG. 9, the scan line 610, the auxiliary scan line 612 and the common electrode line 614 are all disposed on a substrate SUB and are covered by a gate insulation layer GI. A channel layer CH is located on the scan line 610 and defines a position of a gate G. A source S is connected to the channel layer CH and the data line 620, the drain (or referred a first drain) D1 is connected to the channel layer CH and the first pixel electrode 642, and the other drain (or referred to as a second drain) D2 is connected to the channel layer CH and the second pixel electrode 644. In the present embodiment, a bottom-gate type transistor with the gate G located under the channel layer CH is taken as an example, though the invention is not limited thereto. In other embodiments, a top-gate type transistor with the gate G located on top of the channel layer CH can be used. A material of the channel layer CH includes amorphous silicon, polycrystalline silicon, microcrystalline silicon, monocrystalline silicon, nanocrystalline silicon, oxide semiconductor materials, organic semiconductor materials, other suitable materials, or a combination of at least two of the above materials. Here, the gate G, the channel layer CH, the source S, the drain D1 and the drain D2 commonly define the active device 630. Moreover, an insulation layer I covers the active device 630 and the storage capacitors CS1 and CS2, and a passivation layer PV covers the first pixel electrode 642 and the second pixel electrode 644. Here, the so-called "cover" refers to dispose at one side of a corresponding device, and such side is away from the substrate SUB.

It should be noticed that the first pixel electrode 642 is connected to the drain D1 of the active device 630 through a contact window W1, and the second pixel electrode 644 is connected to the drain D2 of the active device 630 through a contact window W2. According to the design of the present embodiment, the drain D2 extends to the adjacent sub-pixel region 602 along the predetermined direction V (for example, the vertical direction), and the contact window W2 is disposed between the scan line 610 and the first pixel electrode 642 of the adjacent sub-pixel region 602. In this way, configuration of the contact window W2 does not influence the display areas of the first pixel electrode 642 and the second pixel electrode 644, which avails improving a display aperture ratio. It should be noticed that a connection line extended from the drain D2 for connecting the second pixel electrode 644 is formed by the patterned conductive layer of the same layer, though the invention is not limited thereto. In other embodiments, the connection line can be selectively formed by a patterned conductive layer different to the patterned conductive layer that forms the drain D2.

Moreover, at least the contact windows W1 and W2, the auxiliary scan line 612, the common electrode line 614, etc. are disposed between the first pixel electrode 642 and the corresponding scan line 610, which avails reducing a coupling effect between the first pixel electrode 642 and the corresponding scan line 610 to improve the display quality. It should be noticed that the so-called "corresponding scan line 610" refers to the scan line 610 used for driving the active device 630 connected to the first pixel electrode 642.

The first pixel electrode 642 and the second pixel electrode 644 driven by the active device 630 and the auxiliary active device 632 may have different display voltages. Therefore, when the designs of the first pixel electrode 642 and the second pixel electrode 644 are applied to the display panel using the vertical alignment liquid crystal material as the display medium, the color washout phenomenon is mitigated. Particularly, when the first shieldable region 642A and the second shieldable region 644A are covered, the first pixel electrode 642 and the second pixel electrode 644 respectively still have a partially exposed areas (i.e. the first non-shielding region 642B and the second non-shielding region 644B), which may still mitigate the color washout phenomenon.

Moreover, in the present embodiment, the first pixel electrode 642 is, for example, divided into the first shieldable region 642A and the first non-shielding region 642B, where a plurality of slits S1 are configured in the first non-shielding region 642B. The slits S1 divide the first non-shielding region 642B into a plurality of alignment regions. Referring to FIG. 8, the slits S1 divide the first non-shielding region 642B into a plurality of alignment regions, for example, four alignment regions, and a resultant vector of the alignment capability provided by the slits S1 in the first non-shielding region 642B is substantially zero. When the design of the first pixel electrode 642 is applied to the display panel using the vertical alignment liquid crystal material as the display medium, the design of the multiple the alignment regions, for example, the four alignment regions, avails implementing a wide viewing-angle display effect.

The second pixel electrode 644 is also partially shielded by the light shieldable element and is divided into the second shieldable region 644A and the second non-shielding region 644B, where a plurality of slits S2 are configured in the second non-shielding region 644B. Similar to the design of the first pixel electrode 642, the slits S2 define four alignment regions in the second non-shielding region 644B, and a resultant vector of the alignment capability provided by the slits S2 in the second non-shielding region 644B is substantially zero. In this way, when the design of the second pixel electrode 644 is applied to the display panel using the vertical alignment liquid crystal material as the display medium, the design of the multiple the alignment regions, for example, the four alignment regions, avails implementing the wide viewing-angle display effect. Certainly, the invention is not limited thereto, and in other embodiments, the slits can be selectively configured in only one of the first non-shielding region 642B of the first pixel electrode 642 and the second non-shielding region 644B of the second pixel electrode 644, or configured in none of the non-shielding regions. Moreover, the slits can be selectively configured in the first shieldable region 642A of the first pixel electrode 642 and the second shieldable region 644A of the second pixel electrode 644.

It should be noticed that in the sub pixel region 602, as shown in FIG. 8, the components extending along the horizontal direction H, for example, the scan line 610, the auxiliary scan lien 612 and the common electrode line 614, etc. are all disposed at one side of the first pixel electrode 642, and the second pixel electrode 644 is located at another side of the first pixel electrode 642. Therefore, none component extends along the horizontal direction H being disposed between the first pixel electrode 642 and the second pixel electrode 644. According to such design, the layout method of the first pixel electrode 642 and the second pixel electrode 644 is much flexible and not limited. Therefore, in an embodiment, when an area ratio of the first pixel electrode 642 and the second pixel electrode 644 is changed along with a specific design requirement, masks used for fabricating the components such as the scan line 610, the data line 620 and the active device 630 are not changed, and only the masks used for fabricating the first pixel electrode 642 and the second pixel electrode 644 are changed, which avails reducing the fabrication cost. Namely, fabrication of the display panel can be more flexible according to the layout design of various components in the sub-pixel region 602.

In overall, besides that the design of the display panel can be more flexible according to the layout of the components in the present embodiment, the display panel may have an ideal display effect, and in the stereo display mode, the cross-talk phenomenon and the color washout phenomenon can be mitigated, and the display may achieve the wide viewing-angle display effect.

Figure 10:
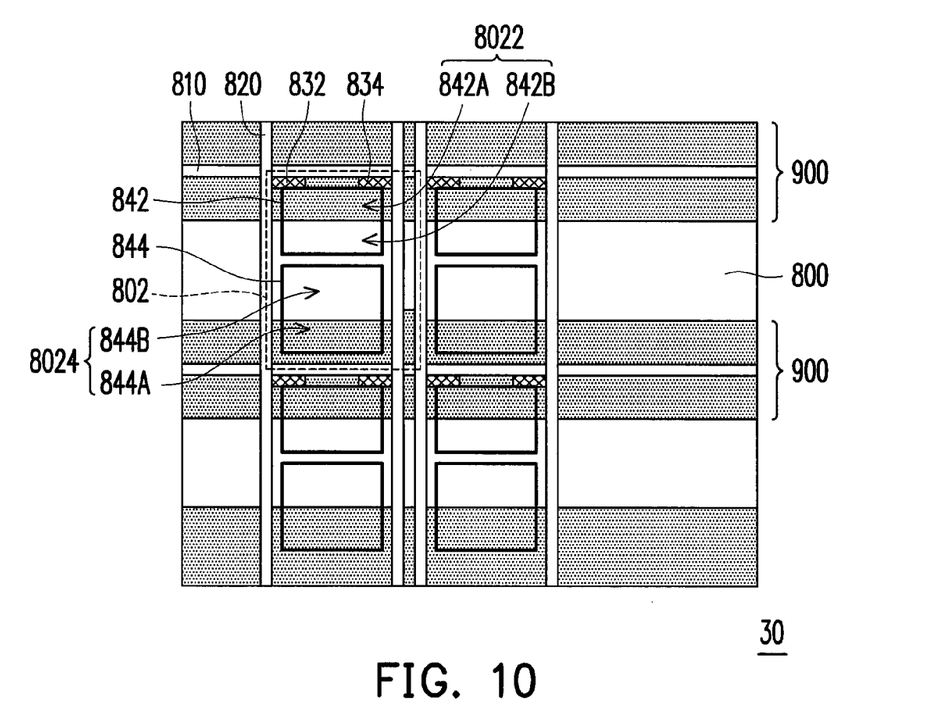
FIG. 10 is a schematic diagram of a stereo display according to still another embodiment of the invention.

However, the invention is not limited to the above design. For example, FIG. 10 is a schematic diagram of a stereo display according to still another embodiment of the invention. Referring to FIG. 10, the stereo display 30 includes a display panel 800 and a light shieldable element 900, where the light shieldable element 900 can be implemented according to the implementations shown in FIGS. 2-6, so that the display light of the display panel 800 can be selectively received by the left eye or the right eye of the user, which is not repeated.

According to FIG. 10, it is known that the display panel 800, for example, includes a plurality of scan lines 810, a plurality of data lines 80, a plurality of first active devices 832m a plurality of second active devices 834, a plurality of first pixel electrodes 842 and a plurality of second pixel electrodes 844. In the present embodiment, the scan lines 810 and the data lines 820 are intersected to define a plurality of sub-pixel regions 802, and at least one first pixel electrode 842 and second pixel electrode 844 are configured in each of the sub-pixel regions 802 to define a first sub-region 8022 and a second sub-region 8024. Namely, a main difference between the present embodiment and the embodiment of FIG. 7 is that the first pixel electrode 842 and the second pixel electrode 844 are respectively connected to two different data lines 820 through the first active device 832 and the second active device 834 driven by the same one scan line 810, and the embodiment of FIG. 7 is a design of the two pixel electrode connected to one data line 620 through the active device driven by the scan line 610 and the auxiliary scan line 612.

In an embodiment, when the display medium of the display panel 800 is the vertical alignment liquid crystal material, the first sub-region 8022 and the second sub-region 8024 may present different display voltages to mitigate the color washout phenomenon, so as to provide an ideal display effect. However, the invention is not limited to use the vertical alignment liquid crystal material as the display medium of the display panel 800. In other types of display panels, the design of configuring at least two pixel electrodes in the same sub-pixel region can also be adopted.

Figure 11:
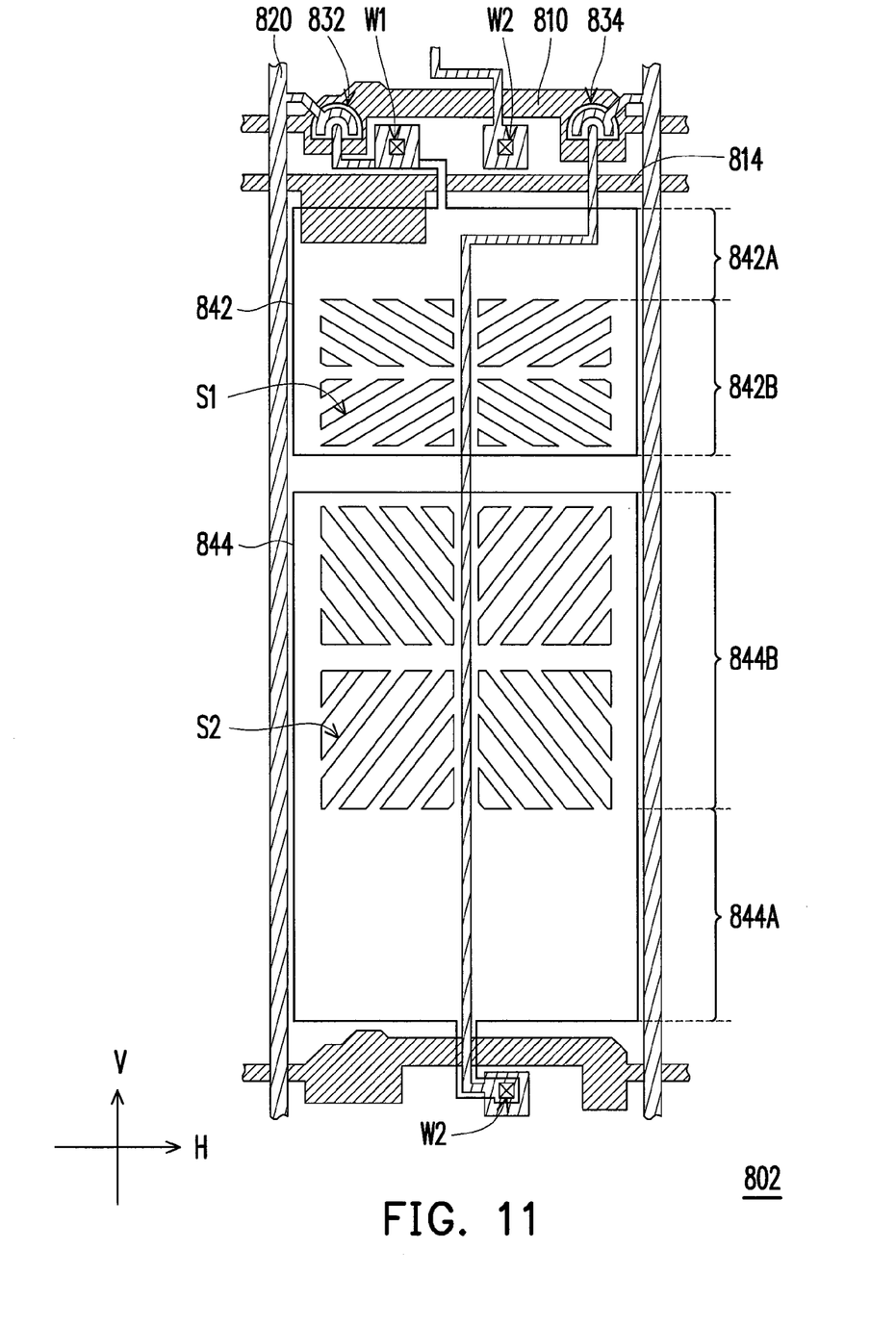
FIG. 11 is a schematic diagram of a layout design of various components in a single sub-pixel region of a display panel of FIG. 10.

FIG. 11 is a schematic diagram of a layout design of various components in a single sub-pixel region of the display panel of FIG. 10. Referring to FIG. 11, the components configured in the sub-pixel region 802 are, for example, the scan line 810, the data lines 820, the first active device 832, the second active device 834, the first pixel electrode 842, the second pixel electrode 844 and a common electrode line 814, where the scan line 810 is used to drive the first active device 832 and the second active device 834, so that the first pixel electrode 842 and the second pixel electrode 844 respectively receive signals transmitted by different data lines 820. In the present embodiment, the storage capacitors are, for example, respectively formed by the common electrode line 814 and a part of the first pixel electrode 842 and formed by the scan line 810 and a part of the second pixel electrode 844 in a next sub-pixel region, or respectively formed by a part of the common electrode line 814 and a part of the first pixel electrode 842 and formed by another part of the common electrode line 814 and a part of the second pixel electrode 844. Moreover, there is an auxiliary storage capacitor, which is, for example, formed by the common electrode line 814 and a part of the second pixel electrode 844, or formed by a drain of the second active device 834 and a part of the first pixel electrode 842, etc.

In the present embodiment, the first pixel electrode 842 has a first shieldable region 842A and a first non-shielding region 842B, and the second pixel electrode 844 has a second shieldable region 844A and a second non-shielding region 844B. Similar to the embodiment of FIG. 8, the slits S1 and S2 can be selectively configured in the first non-shielding region 842B and the second non-shielding region 844B for providing the wide viewing-angle display effect. Moreover, the slits can be selectively configured in the first shieldable region 842A and the second shieldable region 844A. In this way, the first shieldable region 842A and the second shieldable region 844A can also provide the wide viewing-angle display effect in case that they are not shielded.

It should be noticed that the components extending along the horizontal direction H such as the scan line 810 and the common electrode line 814, etc. are not disposed between the first pixel electrode 842 and the second pixel electrode 844, which avails improving flexibility in design of the display panel, and related descriptions of FIG. 8 can be referred for details thereof, which are not repeated. Moreover, in the present embodiment, the first pixel electrode 842 is connected to the drain of the first active device 832 through the contact window W1, and the second pixel electrode 844 is connected to the drain of the second active device 834 through the contact window W2, and the contact window W1 and the contact window W2 are disposed between the scan line 810 and the first pixel electrode 842, which avails reducing a coupling effect between the first pixel electrode 842 and the scan line 810 to improve the display quality. The drain of the second active device 834 extends to cross the first pixel electrode 842 and the second pixel electrode 844, and the drain of the second active device 834 is connected to the second pixel electrode 844 at a position adjacent to the second pixel electrode 844. It should be noticed that a connection line extended from the drain of the second active device 834 for connecting the second pixel electrode 844 is formed by the patterned conductive layer of the same layer, though the invention is not limited thereto. In other embodiments, the connection line can be selectively formed by a patterned conductive layer different to the patterned conductive layer that forms the drain of the second active device 834.

In summary, in the invention, the light shieldable element is disposed in front of the sub-pixel regions of the display panel to selectively shield a part of the area of the pixel electrode, so as to mitigate the cross-talk phenomenon under the stereo display mode. Moreover, the non-shielding region of the pixel electrode has the alignment slits therein, and the alignment capability provided by the alignment slits are substantially even in the non-shielding region, so as to provide the ideal wide viewing-angle display effect. Moreover, each of the sub-pixel regions of the invention may have at least two pixel electrodes therein to define at least two sub-regions with different display voltages, so as to mitigate the color washout phenomenon of the displayed images. Besides, in the sub-pixel region of the invention, none component extending along the horizontal direction is disposed between the first pixel electrode and the second pixel electrode, so that the area layout of the first pixel electrode and the second pixel electrode is not limited, and the design of the stereo display can be more flexible.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A stereo display, comprising:
a display panel, having at least two sub-pixel regions, and each of the sub-pixel regions having at least one first pixel electrode to define at least one first sub-region, wherein the first pixel electrode is connected to at least one data line through at least one first active device, and the first active device is driven by at least one scan line; and
a light shieldable element, disposed in front of the sub-pixel regions, wherein each first pixel electrode has a first shieldable region shielded by the light shieldable element and a first non-shielding region exposed by the light shieldable element, the first shieldable region is closer to the scan line compared to the first non-shielding region, and a total length A of each sub-pixel region and a length B of the first shieldable region along a predetermined direction intersected to a horizontal direction which is defined by a connection line of two eyes of a user watching the stereo display, comply with a relationship that the length B occupies a length percentage (B/A)×100% of substantially from 1.61% to 47.9%, wherein one end of the length B of the first shieldable region terminates at an edge of the first pixel electrode, the other end of the length B of the first shieldable region is within the first pixel electrode, a plurality of slits of the first pixel electrode are configured in the first non-shielding region and a resultant vector of alignment regions defined by the slits within the first non-shielding region is zero.

2. The stereo display of claim 1, wherein the light shieldable element is a light-shielding matrix structure configured to shield the scan lines, the data lines, the first shieldable region of each first pixel electrode, and an opening defined by the light-shielding matrix structure exposes the first non-shielding region of the first pixel electrode.

3. The stereo display of claim 2, wherein the display panel has a pair of substrates, and the light-shielding matrix structure is disposed on an inner surface of one of the substrates of the display panel.

4. The stereo display of claim 2, wherein the display panel has a pair of substrates, and the light-shielding matrix structure is disposed on an outer surface of one of the substrates of the display panel, and the light-shielding matrix structure is covered by a transparent substrate.

5. The stereo display of claim 4, wherein another transparent substrate is disposed between the outer surface of the one of the substrates of the display panel and the light-shielding matrix structure.

6. The stereo display of claim 1, further comprising:
a transparent substrate and a non-self luminous electrically-driven layer, wherein the transparent substrate is disposed in front of the display panel, and the non-self illumination electrically-driven layer is disposed between the display panel and the transparent substrate, and a transparent conductive layer is configured to drive the non-self illumination electrically-driven layer to serve as the light shieldable element.

7. The stereo display of claim 1, further comprising:
a pair of transparent substrates and a non-self illumination electrically-driven layer, wherein the pair of the transparent substrates are disposed in front of the display panel, and the non-self illumination electrically-driven layer is disposed between the pair of the substrates, the light shieldable element is disposed between the pair of the substrates, and a transparent conductive layer is configured to drive the non-self illumination electrically-driven layer to serve as the light shieldable element.

8. The stereo display of claim 1, wherein a display medium of the display panel comprises a vertical alignment liquid crystal material.

9. The stereo display of claim 1, wherein each of the sub-pixel regions is further configured with at least one second pixel electrode to define a second sub-region outside the first sub-region, the second pixel electrode has a second shieldable region shielded by the light shieldable element and a second non-shielding region exposed by the light shieldable element, and the second non-shielding region is closer to the first non-shielding region of the first pixel electrode compared to the second shieldable region.

10. The stereo display of claim 9, wherein the second pixel electrode in each of the sub-pixel regions in the display panel is connected to at least one second active device, and the first active device and the second active device are respectively connected to different scan lines or the same scan line.

11. The stereo display of claim 9, wherein at a resolution of the display panel is substantially from 92 ppi (pixel per inch) to 65 ppi, the length B of the first shieldable region occupies the length percentage (B/A)×100% of substantially from 1.61% to 9.27% in the predetermined direction, a length C of the second shieldable region occupies a length percentage (C/A)×100% of substantially from 3.21% to 18.53% in the predetermined direction, one end of the length C of the second shieldable region terminates at an edge of the second pixel electrode, and the other end of the length C of the second shieldable region is within the second pixel electrode.

12. The stereo display of claim 9, wherein at a resolution of the display panel is substantially from 65 ppi to 27.5 ppi, the length B of the first shieldable region occupies the length percentage (B/A)×100% of substantially from 4.43% to 15.97% in the predetermined direction, a length C of the second shieldable region occupies a length percentage (C/A)×100% of substantially from 8.87% to 31.93% in the predetermined direction, one end of the length C of the second shieldable region terminates at an edge of the second pixel electrode, and the other end of the length C of the second shieldable region is within the second pixel electrode.

13. The stereo display of claim 9, wherein at a resolution of the display panel is substantially from 47 ppi to 16 ppi, the length B of the first shieldable region occupies the length percentage (B/A)×100% of substantially from 2.16% to 10.45% in the predetermined direction, a length C of the second shieldable region occupies a length percentage (C/A)×100% of substantially from 4.33% to 20.90% in the predetermined direction, one end of the length C of the second shieldable region terminates at an edge of the second pixel electrode, and the other end of the length C of the second shieldable region is within the second pixel electrode.

14. The stereo display of claim 9, wherein at a resolution of the display panel is substantially from 23 ppi to 10 ppi, the length B of the first shieldable region occupies a length percentage (B/A)×100% of substantially from 3.56% to 8.38% in the predetermined direction, a length C of the second shieldable region occupies a length percentage (C/A)×100% of substantially from 7.13% to 16.75% in the predetermined direction, one end of the length C of the second shieldable region terminates at an edge of the second pixel electrode, and the other end of the length C of the second shieldable region is within the second pixel electrode.

15. The stereo display of claim 1, wherein a contact window for connecting the first pixel electrode and the at least one first active device is located between the at least one scan line and a common line or between the at least one scan line and the first pixel electrode.

16. A stereo display, comprising:
a display panel, having at least two sub-pixel regions, and each of the sub-pixel regions having at least one first pixel electrode to define at least one first sub-region, wherein the first pixel electrode is connected to at least one data line through at least one first active device, and the first active device is driven by at least one scan line, and a contact window for connecting the first pixel electrode and the at least one first active device is located between the at least one scan line and a common line or between the at least one scan line and the first pixel electrode; and
a light shieldable element, disposed in front of the sub-pixel regions, wherein each first pixel electrode has a first shieldable region shielded by the light shieldable element and a first non-shielding region exposed by the light shieldable element, the first shieldable region is closer to the scan line compared to the first non-shielding region, and a total length A of each sub-pixel region and a length B of the first shieldable region along a predetermined direction intersected to a horizontal direction which is defined by a connection line of two eyes of a user face to the stereo display, comply with a relationship that the length B occupies a length percentage (B/A)×100% of substantially from 1.61% to 47.9%, wherein the length B of the first shieldable region is not extended exceeding an edge of the first pixel electrode.

17. The stereo display of claim 16, wherein the light shieldable element is a light-shielding matrix structure configured to shield the scan lines, the data lines, the first shieldable region of each first pixel electrode, and an opening defined by the light-shielding matrix structure exposes the first non-shielding region of the first pixel electrode.

18. The stereo display of claim 17, wherein the display panel has a pair of substrates, and the light-shielding matrix structure is disposed on an inner surface of one of the substrates of the display panel.

19. The stereo display of claim 17, wherein the display panel has a pair of substrates, and the light-shielding matrix structure is disposed on an outer surface of one of the substrates of the display panel, and the light-shielding matrix structure is covered by a transparent substrate.

20. The stereo display of claim 19, wherein another transparent substrate is disposed between the outer surface of the one of the substrates of the display panel and the light-shielding matrix structure.

21. The stereo display of claim 16, further comprising:
a transparent substrate and a non-self illumination electrically-driven layer, wherein the transparent substrate is disposed in front of the display panel, and the non-self illumination electrically-driven layer is disposed between the display panel and the transparent substrate, and a transparent conductive layer is configured to drive the non-self illumination electrically-driven layer to serve as the light shieldable element.

22. The stereo display of claim 16, further comprising:
a pair of transparent substrates and a non-self illumination electrically-driven layer, wherein the pair of the transparent substrates are disposed in front of the display panel, and the non-self illumination electrically-driven layer is disposed between the pair of the substrates, the light shieldable element is disposed between the pair of the substrates, and the a transparent conductive layer is configured to drive the non-self illumination electrically-driven layer to serve as the light shieldable element.

23. The stereo display of claim 16, wherein a display medium of the display panel comprises a vertical alignment liquid crystal material.

24. The stereo display of claim 16, wherein each of the sub-pixel regions is further configured with at least one second pixel electrode to define a second sub-region outside the first sub-region, the second pixel electrode has a second shieldable region shielded by the light shieldable element and a second non-shielding region exposed by the light shieldable element, and the second non-shielding region is closer to the first non-shielding region of the first pixel electrode compared to the second shieldable region.

25. The stereo display of claim 24, wherein the second pixel electrode in each of the sub-pixel regions in the display panel is connected to at least one second active device, and the first active device and the second active device are respectively connected to different scan lines or the same scan line.

26. The stereo display of claim 24, wherein at a resolution of the display panel is substantially from 92 ppi (pixel per inch) to 65 ppi, the length B of the first shieldable region occupies the length percentage (B/A)×100% of substantially from 1.61% to 9.27% in the predetermined direction, a length C of the second shieldable region occupies a length percentage (C/A)×100% of substantially from 3.21% to 18.53% in the predetermined direction, wherein the length C of the second shieldable region is not extended exceeding an edge of the second pixel electrode.

27. The stereo display of claim 24, wherein at a resolution of the display panel is substantially from 65 ppi to 27.5 ppi, the length B of the first shieldable region occupies the length percentage (B/A)×100% of substantially from 4.43% to 15.97% in the predetermined direction, a length C of the second shieldable region occupies a length percentage (C/A)×100% of substantially from 8.87% to 31.93% in the predetermined direction, wherein the length C of the second shieldable region is not extended exceeding an edge of the second pixel electrode.

28. The stereo display of claim 24, wherein at a resolution of the display panel is substantially from 47 ppi to 16 ppi, the length B of the first shieldable region occupies the length percentage (B/A)×100% of substantially from 2.16% to 10.45% in the predetermined direction, and a length C of the second shieldable region occupies a length percentage (C/A)×100% of substantially from 4.33% to 20.90% in the predetermined direction, wherein the length C of the second shieldable region is not extended exceeding an edge of the second pixel electrode.

29. The stereo display of claim 24, wherein at a resolution of the display panel is substantially from 23 ppi to 10 ppi, the length B of the first shieldable region occupies a length percentage (B/A)×100% of substantially from 3.56% to 8.38% in the predetermined direction, and a length C of the second shieldable region occupies a length percentage (C/A)×100% of substantially from 7.13% to 16.75% in the predetermined direction, wherein the length C of the second shieldable region is not extended exceeding an edge of the second pixel electrode.

* * * * *